(12) United States Patent
Andreasson (10) Patent No.: US 7,529,786 B2
(45) Date of Patent: May 5, 2009

(54) SYSTEM AND METHOD FOR ADAPTIVE GARBAGE COLLECTION IN A VIRTUAL MACHINE ENVIRONMENT

(75) Inventor: Eva Andreasson, Johanneshov (SE)

(73) Assignee: BEA Systems, Inc., San Jose, CA (US)

( * ) Notice: Subject to any disclaimer, the term of this patent is extended or adjusted under 35 U.S.C. 154(b) by 276 days.

(21) Appl. No.: 11/396,752

(22) Filed: Apr. 3, 2006

(65) Prior Publication Data

US 2006/0230087 A1   Oct. 12, 2006

Related U.S. Application Data

(63) Continuation-in-part of application No. 10/630,525, filed on Jul. 30, 2003, now Pat. No. 7,174,354.

(60) Provisional application No. 60/739,226, filed on Nov. 23, 2005.

(51) Int. Cl.
*G06F 17/30* (2006.01)
(52) U.S. Cl. ........................................ 707/206; 711/133
(58) Field of Classification Search ................. 707/206
See application file for complete search history.

(56) References Cited

U.S. PATENT DOCUMENTS

| | | | |
|---|---|---|---|
| 6,349,314 B1 | 2/2002 | Patel | |
| 6,629,113 B1 * | 9/2003 | Lawrence | 707/206 |
| 6,804,691 B2 * | 10/2004 | Coha et al. | 707/206 |
| 6,892,212 B2 | 5/2005 | Shuf et al. | |
| 2003/0126164 A1 * | 7/2003 | O'Connor et al. | 707/206 |
| 2005/0086659 A1 | 4/2005 | Huras et al. | |
| 2005/0166028 A1 | 7/2005 | Chung et al. | |

OTHER PUBLICATIONS

International Search Report, Jan. 30, 2008, 6 pages.

* cited by examiner

*Primary Examiner*—John E Breene
*Assistant Examiner*—Thu-Nguyet Le
(74) *Attorney, Agent, or Firm*—Fliesler Meyer LLP (57) ABSTRACT

A system and method for adaptive or dynamic garbage collection and memory management in computer systems and virtual machine environments, including Java virtual machines. Adaptive techniques attempt to constrain the system to consistently move towards the desired goal. In accordance with an embodiment, the system successively calculates a value of error from the "perfect state", and adjusts parameters so that this value will be reduced on the next round of calculations. In accordance with an embodiment, certain parameters, such as nursery size, can be defined; and the variation in that parameter used to calculate its effect on a particular goal, for example, the pause-time minimization. An error value is then evaluated as the difference between the desired or "goal" pause-time, and the current pause-time. By varying the nursery size in an adaptive manner, the pause-time can then be minimized.

16 Claims, 5 Drawing Sheets

SYSTEM AND METHOD FOR ADAPTIVE GARBAGE COLLECTION IN A VIRTUAL MACHINE ENVIRONMENT

CLAIM OF PRIORITY

This application claims the benefit of U.S. Provisional Patent Application No. 60/739,226; entitled "SYSTEM AND METHOD FOR ADAPTIVE GARBAGE COLLECTION IN A VIRTUAL MACHINE ENVIRONMENT"; inventor Eva Andreasson; filed Nov. 23, 2005, and incorporated herein by reference. This application is also a Continuation-in-Part of U.S. patent application Ser. No. 10/630,525; entitled "SYSTEM AND METHOD FOR REINFORCEMENT LEARNING AND MEMORY MANAGEMENT"; now U.S. Pat. No. 7,174,364, issued on Feb. 6, 2007, by Eva Andreasson; filed Jul. 30, 2003, also incorporated herein by reference.

FIELD OF THE INVENTION

The invention is generally related to memory management in computer systems and virtual machine environments, including Java virtual machines, and is specifically related to a system and method for adaptive or dynamic garbage collection in such environments.

BACKGROUND

In a computer system, the ability to control the allocation of memory resources is vital to the successful operation and scalability of the computer system as a whole. Software applications run more efficiently in environments in which steps are taken to proactively manage available memory resources to ensure that only those entities that are currently being used are stored in memory, while little-used entities are cleanly removed. In some systems and virtual machines, for example, the Java™ Virtual Machine (commonly referred to as a JVM), the system periodically performs a garbage collection. During this process the virtual machine scans the entire memory and finds which objects have been stored in the memory, and which objects the program can no longer address. These areas of memory are then returned for subsequent use by the system.

Current techniques of garbage collection are limited in their abilities to clean the memory, and do not adequately respond to variations in the underlying system. As such, new techniques are needed which can better take into account adaptive variations in the system, and which may be incorporated into existing computer system and virtual machine environments. Some existing approaches address this problem by providing the system administrators (i.e. the users) with a variety of startup options by which the user can customize the operation of their system. However, the individual user requirements have generally increased overtime as to wanting a greater number of startup options, and options that are more specialized for their application needs. The consequence is that the number of startup options for any particular system is typically quite large, and configuration of that system takes an unacceptable amount of time. Other existing approaches may utilize reinforcement learning to determine a best set of options. However, reinforcement learning can occasionally allow a system to stray down the wrong path before finally achieving the desired performance goal.

What is needed then, is a technique by which the design of the virtual machine can satisfy an increasingly larger variety of applications (e.g. Java applications), without requiring the user to choose from a confusing variety of startup options. In addition, the technique should reduce the need for the user having to specify those startup options, while at the same time consistently improving, or at least not reducing, overall system performance.

SUMMARY

The invention is generally related to memory management in computer systems and virtual machine environments, including Java virtual machines, and is specifically related to a system and method for adaptive or dynamic garbage collection in such environments.

In accordance with an embodiment, the invention uses adaptive garbage collection methods to enhance garbage collection in a computer system or virtual machine environment such as a Java Virtual Machine (JVM). The invention can also be used to increase performance of a conventional garbage collector such as in the BEA Systems, Inc. JVM product JRockit™, or in other virtual machine environments. Other embodiments that utilize variations and improvements may be developed within the spirit and scope of the invention.

BRIEF DESCRIPTION OF THE FIGURES

Appendix A shows a code listing for a PID-based adaptive garbage collector system and method in accordance with an embodiment of the invention.

DETAILED DESCRIPTION

The invention is generally related to memory management in computer systems and virtual machine environments, including Java virtual machines, and is specifically related to a system and method for adaptive or dynamic garbage collection in such environments.

In accordance with an embodiment, the invention uses adaptive garbage collection methods to enhance garbage collection in a computer system or virtual machine environment such as a Java Virtual Machine (JVM). The invention can also be used to increase performance of a conventional garbage collector such as in the BEA Systems, Inc. JVM product JRockit™, or in other virtual machine environments. Other embodiments that utilize variations and improvements may be developed within the spirit and scope of the invention.

Generally described, virtual machines developed in accordance with the present invention use an adaptive algorithm, that utilizes feedback to increase the overall performance of the virtual machine. Whereas reinforcement learning techniques can allow the system to occasionally make mistakes, or stray down the wrong path, with the intent that the eventual result is a more successful one; adaptive techniques attempt to constrain the system to consistently move towards the desired goal. In accordance with an embodiment, the system successively calculates a value of error from the "perfect state", and adjusts parameters so that this value will be reduced on the next round of calculations.

In accordance with an embodiment, certain parameters, such as nursery size, can be defined; and the variation in that parameter used to calculate its effect on a particular goal, for example, the pause-time minimization. In a traditional system, the nursery size may be held constant, or may be configured as a constant value using a startup option. In accordance with an embodiment of the present invention, elements of control theory are used, so that the error value is then evaluated as the difference between the desired or "goal" pause-time, and the current pause-time. By varying the nursery size in an adaptive manner, the pause-time can then be minimized.

Introduction to Garbage Collection

Some programming languages use explicit memory allocation and deallocation, for instance C and C++. This demands that programmers using such languages have a lot of knowledge of how a computer is built and how it works. If the programmer would lack this knowledge when constructing a computer program it could result in a computer program with memory leaks and dangling references.

Figure 1:
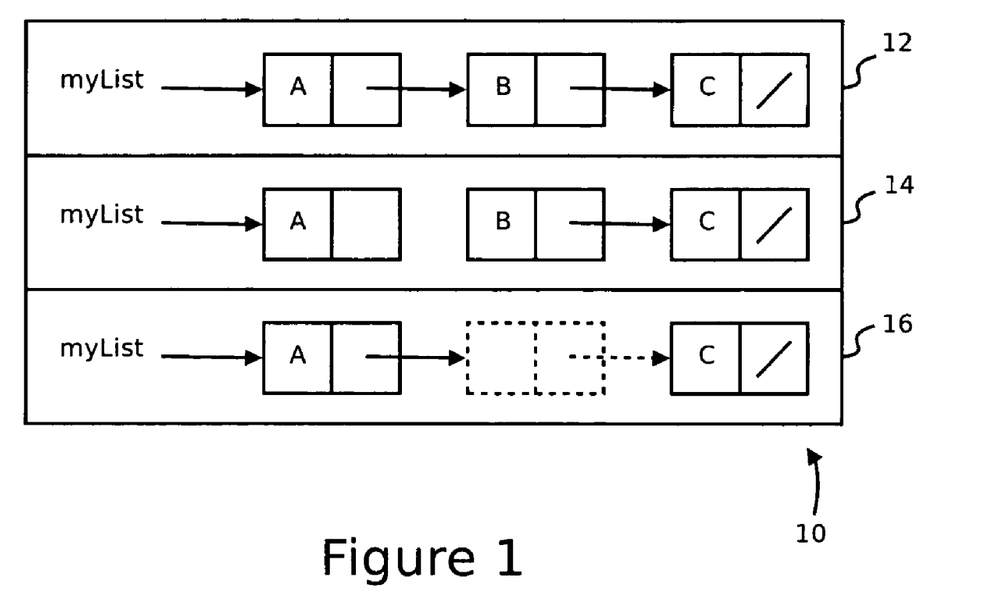
FIG. 1 shows an illustration of a memory including allocations in accordance with an embodiment of the invention.

FIG. 1 shows an illustration of a memory 10 including allocations. As shown in FIG. 1, an allocated list 12 is shown, together with a memory leak 14. At the bottom of the figure a memory leak and a dangling reference 16 are also illustrated. Memory leaks are memory that is referenced by deallocated memory. A dangling reference is a reference to memory that has been deallocated. These problems cause the computer program to eventually crash, or even worse, to keep running but calculating wrong values.

Implicit memory allocating languages need a system that handles the freeing of objects that are no longer used by the running program. A system that handles this is called a garbage collector, since it takes care of garbage caused by the running program.

One purpose of garbage collection is to relieve the programmer from the burden of discovering memory management errors by ensuring that these errors cannot arise, i.e. garbage collection frees the programmer from having to keep track of when to free allocated memory, thereby preventing many potential bugs and headaches.

One difficulty with garbage collecting is to decide which objects are no longer alive (dead). An object is dead if no references to that object exist. If there still are references to an object it is said to be live. For instance, an object-oriented program uses the stack and registers for storing class variables (among other things). The objects that the running program stores are certain to be live. Objects known to be live are referred to as roots. By following the references from the roots all other live objects can be found.

Another difficulty with garbage collection is to prevent heap fragmentation. That is, preventing the free memory spaces of the heap of becoming too small and too scattered so that new objects cannot be allocated, although the total amount of free memory may be sufficient.

Garbage Collection Terminology

The following section describes some of the terminology used herein. Additional discussion of some of these terms and concepts is provided in copending U.S. patent application Ser. No. 10/630,525; entitled "SYSTEM AND METHOD FOR REINFORCEMENT LEARNING AND MEMORY MANAGEMENT"; now U.S. Pat. No. 7,174,354, issued on Feb. 6, 2007, by Eva Andreasson; filed Jul. 30, 2003, and incorporated herein by reference.

Garbage Collection Strategy—As described herein, a garbage collection strategy is a strategy used for reclaiming unreferenced memory. A garbage collection strategy could, for example, be a single-spaced concurrent mark and concurrent sweep, or a generational parallel mark and parallel sweep, etc. A garbage collection algorithm, on the other hand, is the base-algorithm on which one can apply a garbage collection strategy, e.g. Mark-and-Sweep, or Stop-and-Copy.

Static Garbage Collection—Static garbage collection refers to a garbage collection strategy has been specified before the application is started, and that the same strategy is used throughout the whole run.

User—A user is a company, customer or developer who runs Java applications.

Java Heap—The Java heap is where the Java application allocates its objects. It is the Java heap that is garbage collected. The time it takes to garbage collect is dependent on how much live data (how many reachable objects) there is, and consequently indirectly the size of the Java heap.

Stop-the-world Collection—A stop-the-world collection is a garbage collection (or a garbage collection phase) that causes all Java application threads to stop.

Nursery—The nursery, eden, or young space, refers to a separate part of the Java heap where new objects are allocated in a first step, before being moved to old space. The transition—the promotion—to old space is only done if the object is still alive at that point.

Write Barrier—The write barrier is a bit vector in which each bit represents a part of the heap. The bit is set when the corresponding part of the heap is dirty. Dirty means that object references in that area of the heap have been modified. The write barrier is for instance used during the pre-cleaning phase of concurrent garbage collection.

Pause Time—Pause time is the time the Java application threads have to be stopped due to garbage collection.

Promotion Rate—Promotion rate is the amount of memory surviving a young space collection relative the size of the young space.

Mark & Sweep—The Mark & Sweep algorithm is a well-recognized garbage collection algorithm, comprising a mark phase and a sweep phase. During the mark phase, all live objects are found and marked as live. During the sweep phase, unmarked memory is reclaimed for reuse by the Java-application.

Concurrent Garbage Collection—Concurrent garbage collection refers to a "Mostly" concurrent garbage collection strategy. This means that some phases of garbage collection are performed concurrently with running Java application threads. A completely concurrent garbage collector is very difficult to implement, since before reclaiming memory, one needs a "perfect image" of what is live on the Java heap. If Java application threads are allowed to execute at the same time as the garbage collector, the state of what is live on the Java heap may change. Hence, concurrency at all times causes a very large overhead for keeping track of all changes in order to keep a "perfect image" of the Java heap. A mostly concurrent garbage collector, however, is running most of the time concurrent with the Java application. Only a few short stops of the Java application threads are made to ensure this "perfect image", thereof the name "mostly" concurrent. The "mostly" concurrent garbage collection is an implementation of the Mark & Sweep algorithm, and works as follows.

The mostly concurrent garbage collection is split into five phases. The first phase (OC1) is a stop-the-world phase, i.e. all Java application threads are stopped. In the first phase all roots are found and marked live. The second phase (OC2) is concurrent with the Java application threads. During this phase references from live objects are followed and marked live. Almost all live objects are found during this phase. However, if object references have been modified by the allocating Java threads, these changes must be found to obtain the "perfect image" spoken of previously. The changes are therefore marked in a write-barrier, in which a set bit corresponds to an area of the Java heap where a change has been made. The third phase (OC3) is a pre-cleaning phase—where the write-barrier is processed, which in turn saves pause time. The fourth phase (OC4) is a stop-the-world phase, where a final marking is made. Roots and write-barrier are processed once again. At the end of this phase the system is as close to a "true image" of what is live and what is garbage. The fifth and last phase (OC5) is a concurrent sweep phase, and actually starts with a stop-the-world compaction before the actual concurrent sweeping takes place.

Parallel Garbage Collection—Parallel garbage collection means that all CPUs available in the system are used for garbage collection work during garbage collection. Consequently parallel garbage collection is a stop-the-world collections—all Java application threads are stopped during garbage collection. In parallel garbage collection both the mark phase and the sweep phase are stop-the-world phases. During the mark phase the roots are found and the references followed and all found objects are marked live. In the sweep phase compaction and sweeping are performed.

Multi-Generational Garbage Collection—From the assumption that most objects die young, the idea of a generational garbage collector has emerged, in which the Java heap is divided into an old generation and a young generation. New objects are allocated in the young generation space, the nursery. When the young space is full, it is garbage collected in a young collection YC. Only if an object is live at the point of young space garbage collection, will it be moved (promoted) to the old generation, i.e. the old space. Old space is collected (in an old collection OC) either concurrently or using the parallel approach. By using generations, the system spends less time doing old collection. Fewer old collections saves overall processing time, since young generation collection is often cheaper than old generation collection. Having a nursery also reduces fragmentation.

Comparisons Between Garbage Collection Strategies

The previously described garbage collection strategies each have their advantages and disadvantages. For example, if the system is hosting an application that is sensitive to long pause times, then a concurrent garbage collector is the best choice. However, if the system is hosting an application with a lot of long-living objects constantly allocated, then a generational garbage collector might not be the best choice; and instead a single-spaced strategy should be used. If throughput is important, then parallel garbage collection is the optimal choice. The list of recommendations for all of the possible application needs is long, and therefore a lot of knowledge and time is needed to configure a JVM for optimal performance. The user has to make a lot of decisions that require understanding of both the application's needs and the inner workings of the JVM. The is the area that dynamic or adaptive garbage collection addresses.

Adaptive Garbage Collection

As described above, the memory management system of virtual machines, and JVMs, such as the JRockit system, often require a large set of application-dependent options and decisions. Consequently, it is the part of the JVM that often requires the most tuning from the user. Developing an adaptive decision system within the memory management system allows for considerable performance improvements.

The choice between different garbage collection strategies during runtime can be based on static rules. However, in order to make the JVM behave adaptively, the decisions must be based on an adaptive algorithm. Previous tests have shown that a machine learning system will quickly become too complex when considering more than a couple of decision parameters; in some situations the machine learning system also had to be allowed to make "mistakes"—even if it meant causing worst case scenario. If the system is to make advanced decisions within the memory management system, then a simpler adaptive algorithm is needed in which every decision leads to a better state.

In accordance with an embodiment, the system uses techniques from control theory, in particular it uses a combination of static decision rules, and a Proportional, Integral, Derivative (PID)—based system for making the decisions. By introducing adaptiveness, the system reduces the need of specifying startup options, and provide a number of advantages, including: lower requirements on a particular user's JVM knowledge or skills; optimal JVM performance over time; and less need to spend time on manual tuning of the JVM.

In accordance with an embodiment, in order to be able to switch garbage collection strategy during runtime, the mark and sweep phase is split entirely code-wise, so that it really reflects the algorithm used. Another change is that the write barrier can be created during startup whether or not starting in generational or single-spaced mode. By doing so, it is possible to run all of several possible permutations, and to switch between them during runtime. Table 1 shows the possible permutations of garbage collection strategies within the dynamic garbage collector.

TABLE 1

Permutations of garbage collection strategies within a dynamic garbage collector.

| ALIAS | GENERATIONAL | MARK PHASE | SWEEP PHASE |
| --- | --- | --- | --- |
| Genconcon | Yes | Concurrent | Concurrent |
| Singleconcon | No | Concurrent | Concurrent |
| Genparpar | Yes | Parallel | Parallel |
| Singleparpar | No | Parallel | Parallel |
| Genparcon | Yes | Parallel | Concurrent |
| Singleparcon | No | Parallel | Concurrent |
| Genconpar | Yes | Concurrent | Parallel |
| Singleconpar | No | Concurrent | Parallel |

1. Minimizing Pauses

Some users have applications that are very sensitive to the pause-time. For example, large banks often have huge transaction systems, wherein milliseconds can mean millions of dollars in costs. The traditional approach has been to recommend a concurrent garbage collector for these users, either with a young generation or without, depending on feedback from testing. Although a concurrent garbage collector—with our without nursery—is said to reduce pause times, some problems still remain. For instance, the pause times can vary a lot over time, whereas many users want a more consistent behavior and fewer spikes (a spike is in this context a pause time that differs more than 100% from average). Other users may note that a parallel garbage collector at some occasions causes shorter pause times than a concurrent one. Many users also find difficulty in finding the optimal nursery size. Another problem was that it was not obvious that an application will benefit from having a young space during the whole run of the application. In accordance with an embodiment, the solution is to create a pause target. The pause target is defined as a reasonable pause time for the application running. The dynamic system of the adaptive garbage collector then tries to tune configuration values so that the occurring pause times lie within the range of the pause target value. This pause target—if already known by the user—can be set by a startup option for even more precision. However, even though they may, the user does not have to specify a value, since one of the goals of the invention is to reduce the number of startup options that must be set.

2. Choosing Mark Phase

In concurrent garbage collection, the collection is started before the Java heap is completely full. The collection is started in advance so that it may be completed before the Java application threads running concurrently have to stop due to lack of free memory. The purpose of concurrent garbage collection is to not have to stop the world, at least not for a longer period. The only important criterion that matters for choosing mark phase strategy, the actual garbage collection trigger, is the percentage of free memory in the Java heap. A too-high trigger indicates an unbalance in the memory management system. If the trigger value is very high, then changing an otherwise pause-time optimal concurrent mark phase to a parallel one could make the system balanced again. The assumption is that a forced stop is more costly than a planned one; it is better to introduce a preventing action before it is too late. Hence, when the system is unbalanced a parallel mark is more efficient than a concurrent mark that has to be stopped. The principal difficulty is in deciding what is "too high", which is very application dependent. This value can be manually tuned, or the trigger value itself can be an additional configuration value to tune automatically. If the trigger is not too high, then a concurrent mark phase is chosen, as this strategy is the least interruptive—when balance exists in the system.

3. Choosing Sweep Phase

Entering the sweep phase, the trigger is no longer of interest, but the amount of free memory in the Java heap is. If the amount is too small, then there is a risk that the concurrent sweep phase won't be able to finish before the system has to be stopped for a full garbage collection, which is of the kind stop-the-world. Instead of letting this happen and causing a stop-the-world sweep phase half through a concurrent one, the system can switch to a parallel sweep phase directly. Empirical studies have shown that the system performance gains by the switch in advance. The amount of memory available before the sweep phase will affect the recalculation of the trigger value at a later point. The fact that the system had to use a parallel phase although optimizing over pause times will also be taken into consideration when recalculating the trigger. Based on this, the amount of free memory before the sweep phase affects the trigger and that the trigger affects the mark phase, it is an obvious decision factor for the choice of strategy for mark and sweep phases during pause time minimization.

4. Maximizing Throughput

For all users not considering pause times a problem, the system provides a throughput optimizing strategy. Since there is no advantage in using a concurrent strategy to optimize over throughput, this was a simple decision to make. The mark phase and the sweep phase are both parallel at all times when trying to maximize throughput. There is also no need to consider the garbage collection trigger, since parallel garbage collection is triggered only when the heap is full.

5. Generational or Non-Generational GC

The actual question here is not about the presence of a nursery or not, but rather how large the nursery should be. The optimal nursery size differs between applications and hence optimal performance for an application can not be achieved by choosing between a nursery of a fixed size and no nursery at all, if the nursery size is wrong.

Using a PID-Controller with Adaptive Garbage Collection

In accordance with an embodiment, the system utilizes an algorithm that can change the nursery size during runtime, without the down-side of using a learning algorithm having to visit the worst-case states and without the jagged behavior of using static rules. The PID technique is instead reliable and smooth. Introducing a PID-controller makes it possible to adapt the nursery size towards the application-optimal size.

Figure 2:
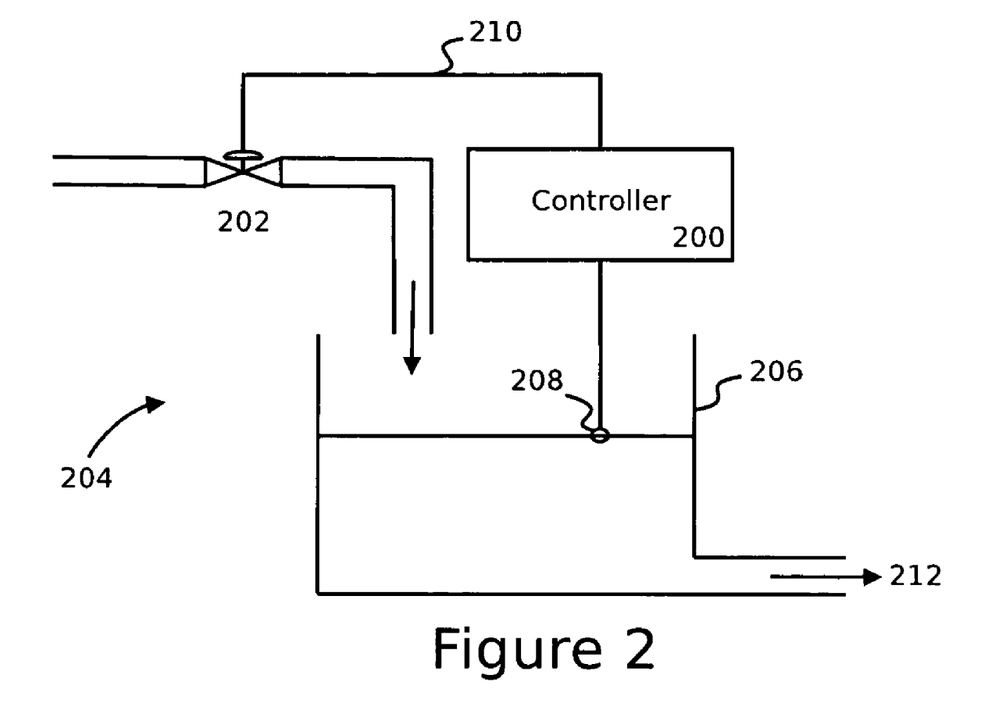
FIG. 2 shows an illustration of a PID technique as may be used with embodiments of the invention.

FIG. 2 shows an illustration of a PID technique as may be used with embodiments of the invention. As shown in FIG. 2, PID acts like a controller 200 to a tap 202 in a system 204 that contains a "leaky bucket" 206. By determining the level 208 of water in the bucket, the controller can adjust 210 the tap to keep the water level at a desired level and to compensate for the flow 212 of water leaving the bucket.

In accordance with an embodiment of the present invention, the PID-controller comprises an error-based adjustment component, wherein the error is based on the difference between a desired value and the current value of a measurable parameter (i.e. the pause time, or the throughput). The adjustment component is then applied to the control parameter to affect the behavior of the system.

Figure 3:
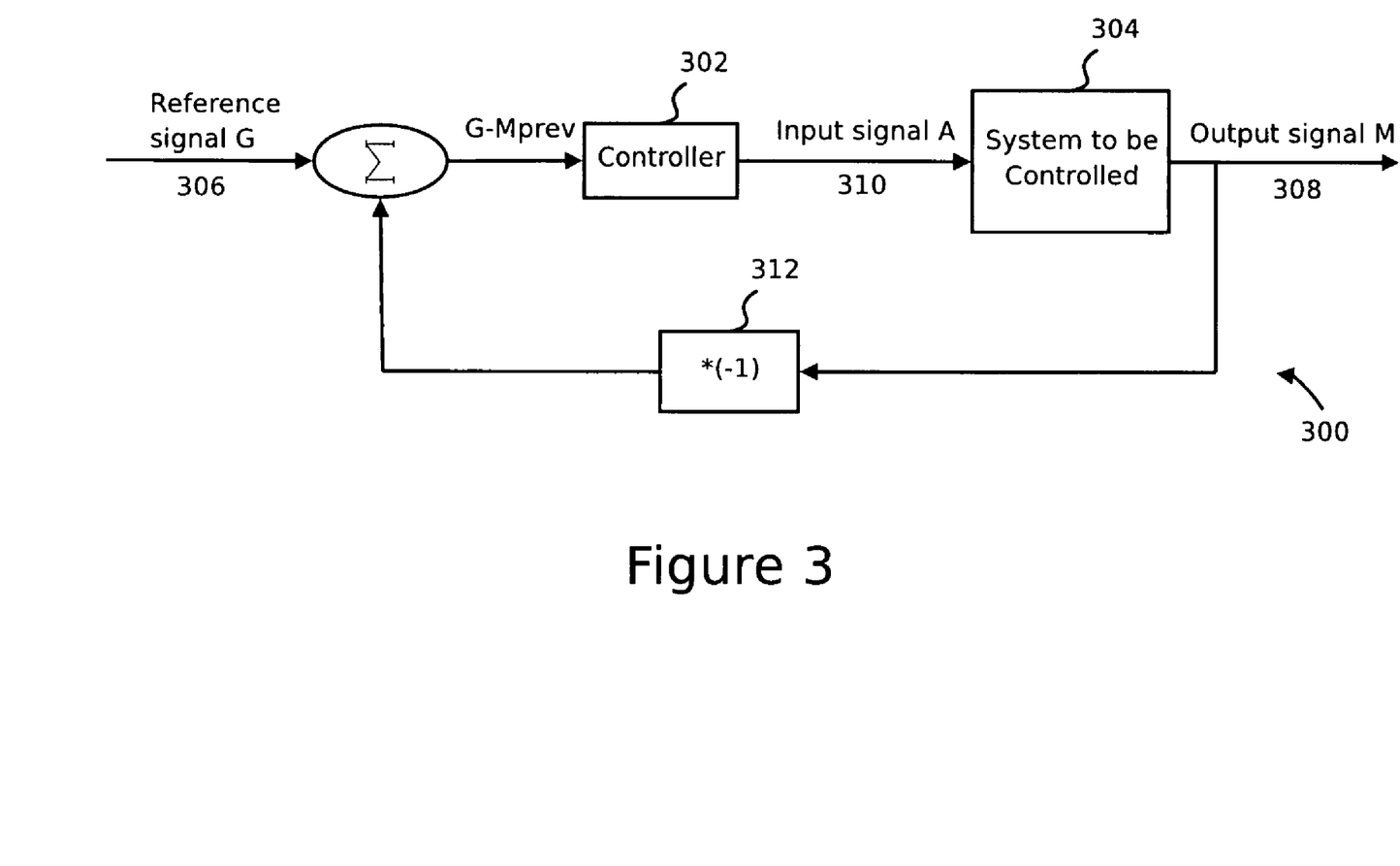
FIG. 3 shows an illustration of an adaptive garbage collection technique as may be used with an embodiment of the invention.

FIG. 3 shows an illustration of an adaptive garbage collection technique 300 as may be used with an embodiment of the invention. As shown in FIG. 3, for example, in the pause-minimizing case, an adaptive garbage collector, or adaptive garbage collector logic, plays the role of controller 302. The system 304 to be controlled is the JVM, or more appropriately the garbage collection of a virtual machine. The value G 306 is the desired pause time (the target). The output signal M 308 is the previous OC 4 pause time. The input signal A 310 is the adjustment to the system (in this example, the fractional change of the nursery size). The output signal is fed back 312 to the controller and used to perform subsequent adjustments to the system.

Let M be the current value of the measurable parameter and $M_{prev}$ the previous measurement and let G be the desired goal for this parameter. Let C be the current value of the control parameter and let $C_{next}$ be the new value of the control parameter. Let A be the fractional adjustment needed to calculate $C_{next}$ from C:

$$C_{next}=(1+A)*C$$

Let E be the current absolute error calculated as G−M and let $E_{prev}$ be the previous absolute error. The component P is the proportional component calculated as $P=C_p*E$. The component I is the integral component ($I_{prev}$ is the value calculate for the last iteration), and is calculated as $I=C_i*(I_{prev}+E)/2$. The component D is the derivate component calculated as $D=C_d*(E_{prev}-E)$. To calculate A tuned constants are necessary. In accordance with an embodiment these are called: $C_p$, $C_i$ and $C_d$. The adjustment value then becomes:

$$A=C_p*P+C_i*I+C_d*D$$

An embodiment of the present invention uses the constants $C_p=0.5$, $C_i=0.2$ and $C_d=0.2$.

Nursery Adjustments if Minimizing Pauses

In accordance with an embodiment, in the pause-minimizing case, the desired value to adjust towards is the pause target, as described above. This desired pause time can be either the specified default value (for example, 500 ms), or for particularly pause-sensitive users (who may often know the pause time limit) by startup options specified target. Measurements have indicated that the young collection performed in the fourth phase of a concurrent old space collection (OC) is often the reason for observed pause time spikes. Based on the pause time formula:

$$TotOC = OC_1 + OC_4 + E$$

$$OC_1 = WB_{proc} + YC_{oc1}$$

$$OC_4 = WB_{proc} + CompT + YC_{oc4}$$

Let $C_c$ be the average time it takes to clean a reference and let approx_noof_refs=(average of refs in a card)*noof_dirty_cards, then WBproc=approx_noof_refs*$C_c$.

Let $C_m$ be the time to move a kilobyte of data and $C_u$ be the time it takes to update a reference to a moved object, then CompT=$C_m$*amount_of_moved_data+$C_u$*noof_regs_to_update Let $C_o$ be the time it takes to promote a kilobyte from the nursery to the old heap, then $YC_{oc4}=C_o$*amount_of_live_data_in_nursery Let e be the error in measurement, then E=Σe; the potential error in measurement.

The pause time formula is based on three assumptions, namely: (1) a larger nursery has a potential of containing more live data; (2) a larger nursery has potential of causing more dirty bits in the write barrier; and (3) a larger nursery prevents fragmentation better. Based on these assumptions, it can be assumed that nursery size affects the pause time of phase four in the following way. (1) if being generational the system will gain by shrinking it if pause times were too long, if they are below pause target the system could afford to increase nursery; (2) if $WB_{proc}$ takes too long, the system will probably benefit of shrinking the nursery; and (3) if causing fragmentation to some extent by shrinking the nursery, the compaction will be more beneficial and also obtain a better CompT due to the decisions of the compaction area choosing heuristics (explained in Dynamic compaction) being more correct.

Being Generational and Minimizing Pauses

In accordance with an embodiment, when entering the decision point as a generational garbage collector and finding phase four of the last concurrent old space collection differing from the desired pause target, the system attempts to adjust the nursery size. Based on current value (P), some history (I), the prognosis of where the system is heading (D), and the decision specific constants ($C_x$) the system cam obtain an adjusting percent value. For example, if the measured pause is 25% longer than the desired pause the system will end up decreasing the nursery with approximately 25% (the real value probably differs from 25% due to the effects of I and D). The rationale behind this is that, if a nursery collection takes too long, then there is a lot of live data in it, hence the system will want to shrink it so that the system does not need to move as much living data at each nursery collection. If instead the pause was shorter than the desired pause target, the system could probably afford to have a larger nursery.

Being Single-Spaced and Minimizing Pauses

In accordance with an embodiment, when entering the decision point as a single-spaced garbage collector, the system measures the last phase-four pause times and determines if that time is longer than the last generational phase-four pause time. If it is, it means that it was better from a pause time perspective to have a nursery than not, since the pause time the system compared with is the worst case so far when being in generational mode. The system can change back to generational mode and set the nursery size to be the last used nursery size. If the previous phase-four pause time is equal to, or shorter than, the last generational phase-four pause time, then the system can continue as single-spaced. Comparing with the last generational phase-four pause time makes sense, since it was that pause time that made the system change strategy.

Nursery Adjustments if Maximizing Throughput

Trying to maximize throughput during runtime is trickier than minimizing pauses. For example, how does one measure throughput during runtime and what exactly is throughput? In accordance with an embodiment, the system defines throughput as how much work the application gets done between two decision points. This really means how many clock cycles the application have access to for its execution. In order to obtain a measurement of the throughput the system performs the following adjustments:

throughput=*app*work/*tot*work

Since appwork=totwork−gcwork, then the system will get throughput=1−(*gc*work/*tot*work)

wherein appwork=clock-cycles used by the application for execution; totwork=total amount of clock-cycles; and gcwork=clock-cycles occupied by the garbage collector that otherwise would have been available for the application.

Garbage collection work can be measured as clock-cycles used by the garbage collecting threads, or rather clock-cycles that could not be used for application work due to garbage collection. The formula above also provides the explanation as to why a positive adjustment means decreasing in the pause-minimizing case and increasing in the throughput-maximizing case. The measurement is negative in the throughput case.

An additional definition of throughput is how fast one can reclaim used memory. Based on this definition the system can use the promotion as a proper measurement for the deciding nursery size. Promotion rate is the average amount of promoted live data during a young collection relative the nursery size. Promotion rate thus captures the relation between nursery and memory reclamation, i.e. the throughput. Promotion rate is dependent on nursery size, hence a change in nursery size will affect the throughput.

Being Generational and Maximizing Throughput

In accordance with an embodiment, if entering the decision point as a generational garbage collector and finding that the calculated promotion rate differs from the promotion rate limit, then the system can calculate a proper adjustment. Based on current value (P), some history (I), the prognosis of where the system is heading (D), and the decision specific constants ($C_x$), the system can obtain an adjusting percent value. For example, if the measured promotion rate is 5% above the limit, then the system will increase the nursery with approximately 5% (the real value probably differs from 5% due to the effects of I and D). The rational behind this is that if too much data is promoted during a young collection, the nursery is too small. Hence, the system will want to increase the nursery size so that the rate (which is dependent on the nursery size) reaches the desired percentage. The opposite applies if too little data is promoted; in that case the system should shrink the nursery in order to reach the wanted promotion rate and in order to increase old space, so that an old collection is put off even further.

Being Single Spaced and Maximizing Throughput

In accordance with an embodiment, when entering the decision point as a single-spaced garbage collector, the system can measure the amount of clock-cycles used by the garbage collector since the last decision. If that amount is larger than the last amount of garbage collection work performed by a generational strategy, the system will change back to generational mode. When changing to a generational strategy the system set the nursery size to be the last used nursery size. Comparing the current amount of garbage collection work with the last generational period's garbage collection work makes sense since it was that period that made the system change to a single-spaced strategy. If the amount of garbage collection work is less than, or equal to, the last generational period's amount of garbage collection work, the system continue with a single-spaced strategy.

Figure 4:
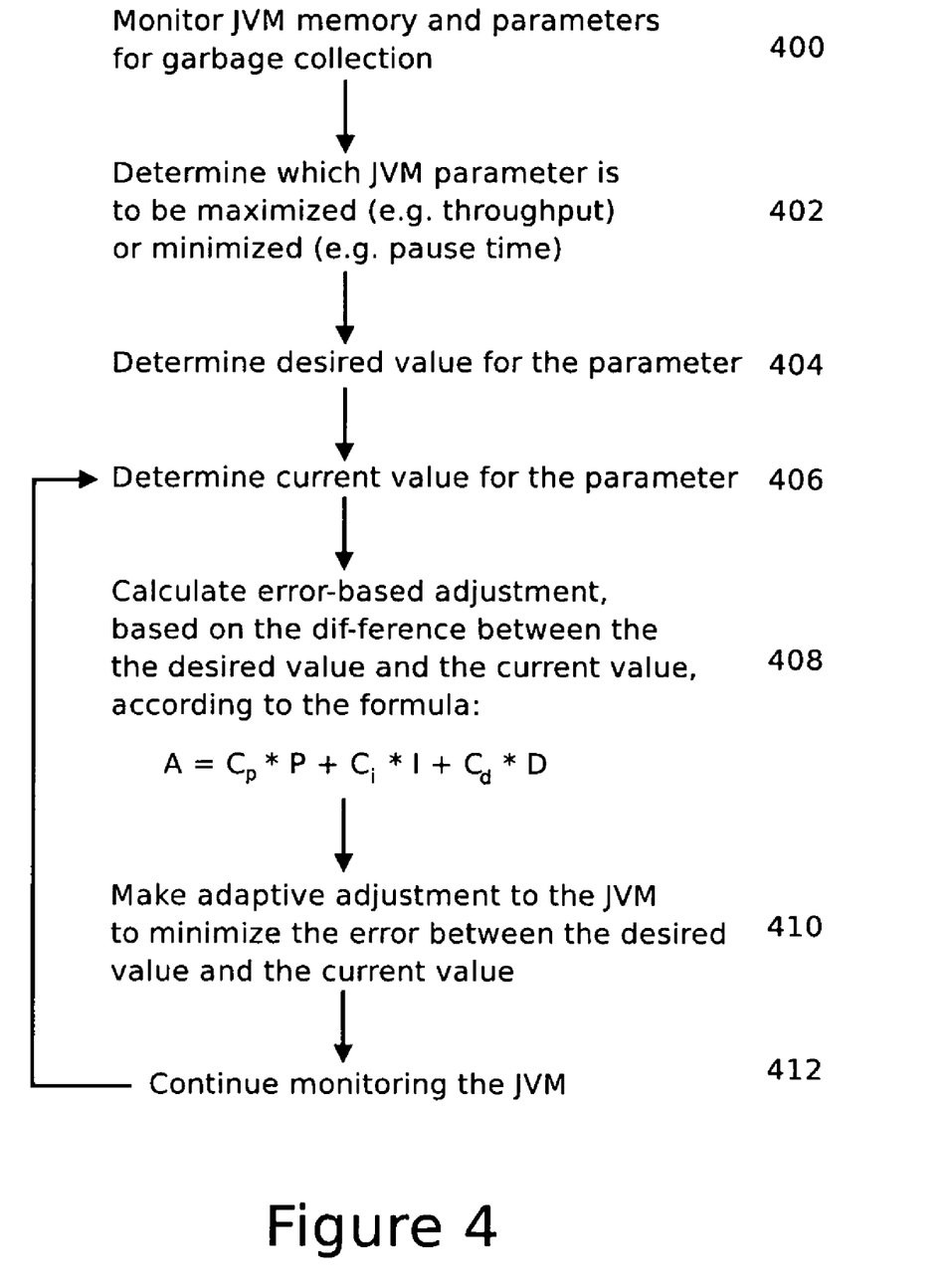
FIG. 4 shows a flowchart of an adaptive garbage collection method as may be used with an embodiment of the invention.

FIG. 4 shows a flowchart of an adaptive garbage collection method as may be used with an embodiment of the invention. As shown in FIG. 4, in step 400, the system monitors JVM memory and parameters for garbage collection. In step 402, the system (or a user) determines which JVM parameter is to be maximized (e.g. throughput), or minimized (e.g. pause time). In step 404, a desired value is determined for the parameter. In step 406, the current value for the parameter is determined. In step 408, the system, (in particular, the adaptive garbage collector and/or the PID controller), calculates an error-based adjustment, based on the difference between the desired value and the current value. In step 410, the system makes adaptive adjustment to the JVM to minimize the error between the desired value and the current value. In step 412, the system will continue monitoring the JVM, including determining the current value for the parameters and repeating the cycle.

Special Cases and Considerations

In accordance with an embodiment, the nursery size has two end points; the maximum allowed nursery size is 95% of available memory, and the minimum allowed nursery size is 2048×18 bytes (36k§). When the system exceeds any of the end points, the system switches to single spaced. The rationale for this rule is that a nursery is of no use in cases where a smaller or larger nursery than allowed is asked for. The same rule applies for both pause-minimizing and throughput-maximizing. In the throughput-maximizing case there is however a difference. In addition to saving the latest nursery size when switching to single spaced—just as the system will do in the pause-minimizing case—the system will also increase or decrease the promotion rate limit. The system changes the desired promotion rate value in order to make it possible for the nursery stay at a small (or a large) size. The system wants to avoid the situation where a switch between a single-spaced strategy and a generational is done at every decision point. If the limit is incorrectly set, then the size will be incorrectly "pushed overboard", although the optimal size will be a very small or a very large one.

Switching to single spaced is a discontinuous choice. In order to obtain fair values for the breaks in the otherwise continuous decision chain of choosing nursery size, the system needs to make adjustments to the PID-system. The adjustment yields for both the throughput-maximizing and the pause-minimizing cases. The system simply eliminates some history by setting the previous error to zero when switching to single spaced.

Dynamic Compaction

In throughput-maximizing mode the compaction uses a static approach to choose compaction area. The algorithm for choosing area is based on a sliding window principle. The compaction area size is changed only when necessary and by pre-decided sizes. When minimizing pause times the system compacts during the fifth phase of the concurrent garbage collection (or during parallel sweep if that is the current strategy). The system uses a dynamic heuristic for choosing compaction area size and the system also chooses where to compact. The compaction can either be internal or external. Internal compaction means compacting objects within a certain area of the heap, while external compaction means evacuating objects to make another area more compacted. The compaction heuristics when minimizing pause times is based on the pause time target.

Additional Implementation and Features

The dynamic garbage collecting system described above will not cover all applications. The dynamic garbage collector is most of all recommended for long-time running systems—like server side applications. Hence, dynamic garbage collection might not solve the situation for all applications.

Pressing pause target will press the system. If pressing the system by setting a too low pause target, there is no guarantee that the system will perform better, actually there are a greater risk for spikes if pressing the system too much.

A larger nursery will not always be optimal since the size causes longer young space collection pause times. A way of solving this on multi-CPU systems is the introduction of the parallel young collection. A larger nursery also stands in conflict with long compaction times. Compaction and young collection somewhat serves the same purpose—to reduce fragmentation and hence indirectly save old space collection time. With a new compaction area choosing heuristic and a rule that stops compaction if exceeding pause target, the system can gain pause time during the beginning of phase five.

If having a nursery is enough for an application to finish, that is if no old collections were performed during the run of the application, then optimal performance will not be reached. It will not be reached because of the decision point being placed during old collection. An improvement is to make nursery size decisions a couple of times during the allocation phase—where a lot of nursery collections are done. But the setup of the nursery must still be performed during old collection.

Additional implementations may include configuring the old collection trigger value in the concurrent case, the heap size and the thread local area size. Other implementations may make it possible to expand nursery during young collection.

When switching between generational and non-generational strategies, the system may for some applications end up in situations where the system tend to switch a lot. This indicates for a part of those applications that it probably does not matter if the system are single spaced or not.

Another idea is to integrate the pause time sensitivity with the throughput-maximizing system, to create a dynamic garbage collector always optimizing throughput considering a certain pause limit.

Implementation within an Application Server Environment

Figure 5:
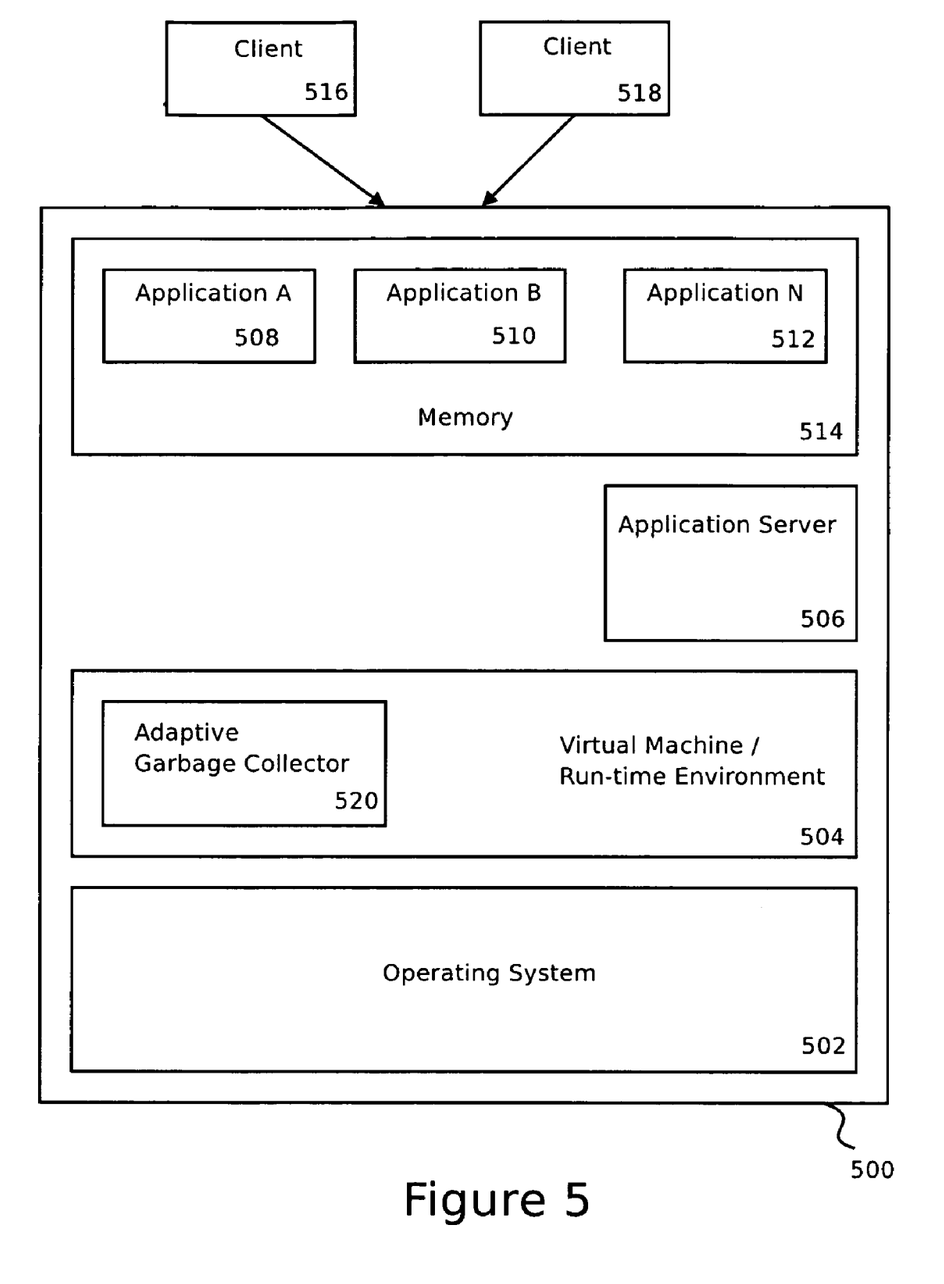
FIG. 5 shows a diagram of a system in accordance with an embodiment of the invention, and illustrates how a garbage collector can be used in an application server environment or system to optimize the application server and the applications running thereon.

FIG. 5 illustrates how the invention can be used in an application server environment or system to optimize the application server and the applications running thereon. As shown in FIG. 5, the computer system 500 typically includes an operating system 502 upon which a virtual machine 504

(such as a JVM or run time environment) operates. The application server 506 sits upon this JVM run time environment. Applications 508, 510, 512 execute within the memory 514 of the system, where they may be accessed by clients 516, 518. An adaptive garbage collector 520 in accordance with an embodiment of the invention is used in conjunction with the virtual machine to garbage collect the memory in accordance with the adaptive garbage collection and PID techniques described herein.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art. Appendix A shows a code listing for a PID-based adaptive garbage collector system and method in accordance with an embodiment of the invention, although it will be evident that other embodiments may employ different programming.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of an embodiment of the present invention has been provided for the purposes of illustration and description. It is not intended to be exhaustive or to limit the invention to the precise forms disclosed. Many modifications and variations will be apparent to the practitioner skilled in the art. Particularly, it will be evident that while embodiments of the invention have been described herein with respect to a WebLogic or JRockit environment, that various embodiments and implementations may also be used with other application servers, virtual machines, and environments. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

APPENDIX A

```
/**
 * An extract from the code with the essential functions.
 */
/**
 * Finds out the proportional component for a PID-regulator.
 *
 * @note this function exists only for clarity, the multiplication
 *       of the current error and a constant may be executed elsewhere
 *       as long as the result is included in the PID-sum.
 *
 * @param constant - the proportional constant value
 * @param currentError - the current error
 * @return the proportional component
 */
static double
mmGetProportionalComponent(double constant, double currentError)
{
   return constant * currentError;
}
/**
 * Finds out the integral component for the part of the PID-regulator
 * regulating the nursery size.
 *
 * @param constant - the integral constant value
 * @param currentError - the current error
 * @return the integral component
 */
static double
mmGetIntegralComponent(double constant, double currentError)
{
   return constant * (mmPreviousIntegralComponent + currentError)/2;
}
/**
 * Finds out the derivated component for the part of the PID-regulator
 * regulating the nursery size.
 *
 * @param constant - the derivate constant value
 * @param currentError - the current error
 * @return the derivated component
 */
static double
mmGetDerivatedComponent(double constant, double currentError)
{
   return constant * (mmPreviousError - currentError);
}
/**
 * Lets a PID system decide what size of nursery we should have.
```

APPENDIX A-continued

```
 *
 * @param currentError - the current error.
 * @return TRUE if a nursery is suggested, FALSE otherwise.
 */
static size_t
mmChangeNurserySize(double currentError)
{
   double nurserySizeChange;
   double prop, deriv;
   size_t recommendedNurserySize = mmNurseryGetSize( );
   prop = mmGetProportionalComponent(0.5, currentError);
   integ = mmGetIntegralComponent(0.2, currentError);
   deriv = mmGetDerivatedComponent(0.2, currentError);
   //calculate the change in percentage
   nurserySizeChange = 1 + (prop + integ + deriv);
         recommendedNurserySize   =   (size_t)   (recommendedNurserySize   *
nurserySizeChange);
   return recommendedNurserySize;
}
/**
 * Pre-deciding function for deciding what action to do to reduce pause times
 */
static void
mmDecidePauseTimeAction(void)
{
   double currentError;
   Bool nurserySizeDecision = TRUE;
   size_t nurserySize;
   if(mmGetPauseTarget( ) == 0)
   {
      mmSetPauseTarget(MM_DEFAULT_MAX_PAUSE_TIME);
   }
      //if the period since last decision was generational and yc:s have occurred
inbetween
   if(mmGetNoofYCsBetweenGCDecisions( ) > 0 && mmIsMultiGenerational( ))
   {
                  currentError    =    (double)    (mmGetPauseTarget( )    –
max(mmGetLongestYCPauseTime( ),mmGetLastOCPauseTime( )));
                  mmLastGenerationalOCPauseTime      =
max(mmGetLastOCPauseTime( ),mmGetLongestYCPauseTime( ));
      mmResetNoofYCsBetweenGCDecisions( );
      mmClearLongestYCPauseTime( );
   }
   else
   {
      if(mmGetLastOCPauseTime( ) > mmLastGenerationalOCPauseTime)
      {
         mmSetNurseryNeeded( );
         if(firstTime)
            firstTime = FALSE;
         else
         {
            nurserySize = mmAlignUpObjectSize(mmGetNurseryReturnSize( ));
            mmSetWantedNurserySize(nurserySize);
         }
      }
      return;
   }
   //if showed to be useful, other decision actions may be added here under
   //different terms - currently only able to choose change in nursery size
   if(nurserySizeDecision && mmGetInitialNurserySize( ) == 0)
   {
      nurserySize = mmChangeNurserySize(currentError);
         //if suggesting a nursery size that exceeds the nursery size lower limit
      if(nurserySize <= MM_MIN_NURSERY_SIZE)
      {
         mmPreviousError = 0.0; //can't shrink nursery any more, so we have
reached "optimal" size
         mmResetNurseryNeeded( );
            //if returning to generational, return to a slightly larger nursery
size
         mmSetNurseryReturnSize(mmAlignUpObjectSize((size_t)
(mmNurseryGetSize( )* 1.10)));
            return;
      }
      //if suggesting a nursery size that exceeds the nursery size upper limit
      //note that a check if the max size actually fits into the freelist is
done at a later point...
      else if(mmIsLiveDataLimitExceeded( ))
```

APPENDIX A-continued

```
      {
            mmPreviousError = 0.0; //can't increase nursery any more, so we have
reached "optimal" size
            mmResetNurseryNeeded( );
            mmResetLiveDataLimitExceeded( );
            //if returning to generational, return to a slightly smaller nursery
size
            mmSetNurseryReturnSize(mmAlignUpObjectSize((size_t)
(mmNurseryGetSize( )* 0.90)));
            return;
      }
      else
      {
            mmPreviousError = currentError; //store the current error for next
calculation
            mmPreviousIntegralComponent = integ; //store it for the next
calculation
         nurserySize = mmAlignUpObjectSize(nurserySize);
      }
      mmSetWantedNurserySize(nurserySize);
      mmSetNurseryNeeded( );
   }
}
/**
 * Pre-deciding function for deciding what action to do to increase throughput.
 */
static void
mmDecideThroughputAction(void)
{
   size_t nurserySize = 0;
   double currentError, promotionPercentage = 0;
   Bool nurserySizeDecision = TRUE;
      //if the period since last decision was generational and yc:s have occurred
inbetween
   if(mmGetNoofYCsBetweenGCDecisions( ) > 0 && mmIsMultiGenerational( ))
   {
                              promotionPercentage    =    (double)
mmGetPromotedSizeBetweenGCDecisions( )/(mmNurseryGetSize( ) *
mmGetNoofYCsBetweenGCDecisions( ));
       mmResetPromotedSizeBetweenGCDecisions( );
       mmResetNoofYCsBetweenGCDecisions( );
       //to save the most recent generational gc score
                  mmSetGenerationalGCWorkScore((double)mmGetCurrentGCWorkScore( )/
(utilGetProcessorTimeInMillis(utilGetProcessorTimeSince(prevTime))*
mmGetNumberOfThreads( )));
       prevTime = utilGetProcessorTime( );
       mmResetCurrentGCWorkScore( );
          //calculate current error - we want opposite action of error indication,
thereof the sign changes
       currentError = promotionPercentage – mmGetPromotionRateLimit( );
   }
    else
    {
                          if(mmGetGenerationalGCWorkScore( )    <=
((double)mmGetCurrentGCWorkScore( )/(utilGetProcessorTimeInMillis(utilGetProcessor
TimeSince(prevTime))* (double) mmGetNumberOfThreads( ))))
      {
         mmSetNurseryNeeded( );
         if(firstTime)
            firstTime = FALSE;
         else
         {
            nurserySize = mmAlignUpObjectSize(mmGetNurseryReturnSize( ));
            mmSetWantedNurserySize(nurserySize);
         }
      }
      prevTime = utilGetProcessorTime( );
      mmResetCurrentGCWorkScore( );
      return;
   }
   //if showed to be useful, other decision actions may be added here under
   //different terms - currently only able to choose change in nursery size
   if(nurserySizeDecision && mmGetInitialNurserySize( ) == 0)
   {
      nurserySize = mmChangeNurserySize(currentError);
       //if suggesting a nursery size that exceeds the nursery size lower limit
      if(nurserySize <= MM_MIN_NURSERY_SIZE)
      {
         //can't shrink nursery any more, so the optimal is singlespaced
```

APPENDIX A-continued

```
    mmPreviousError = 0.0;
    mmResetNurseryNeeded( );
    //return to 110% of current nursery size
        mmSetNurseryReturnSize(mmAlignUpObjectSize((size_t)(mmNurseryGetSize( )*
1.10)));
    mmSetPromotionRateLimit(mmGetPromotionRateLimit( )/2);
    return;
    }
    //if suggesting a nursery size that exceeds the nursery size upper limit
    //note that a check if the max size actually fits into the freelist is
done at a later point...
    else if(mmIsLiveDataLimitExceeded( ))
    {
    //can't increase nursery any more, so the optimal is singlespaced
    mmPreviousError = 0.0;
    mmResetNurseryNeeded( );
    //return to 90% of current nursery size
        mmSetNurseryReturnSize(mmAlignUpObjectSize((size_t)
(mmNurseryGetSize( )* 0.90)));
    mmSetPromotionRateLimit(mmGetPromotionRateLimit( ) + 0.005);
    mmResetLiveDataLimitExceeded( );
    return;
    }
    else
    {
        mmPreviousError  =  currentError;   //store the current error for next
calculation
        mmPreviousIntegralComponent  =  integ;   //store it for the next
calculation
    nurserySize = mmAlignUpObjectSize(nurserySize);
    }
    mmSetWantedNurserySize(nurserySize);
    mmSetNurseryNeeded( );
    }
}
```

What is claimed is:

1. A system for adaptive garbage collection in a virtual machine environment, comprising:

a computer including a virtual machine thereon for executing applications;

memory including objects therein related to the applications;

an adaptive garbage collector that uses an automatic feedback that continuously monitors current behavior of the adaptive garbage collector and the virtual machine, and continuously makes adjustments to configurable parameters of the adaptive garbage collector and the virtual machine to reduce difference between the current behavior and desired behavior of the adaptive garbage collector and the virtual machine, collects and removes objects in the memory that are no longer used by the applications;

wherein the adaptive garbage collector is configured to operate in both a mark phase and a sweep phase of garbage collection, including allowing the garbage collector to use one of a concurrent, parallel and multi-generational garbage collection strategies during the mark phase of the garbage collection, and then switch to using a different one of concurrent, parallel, and multi-generational garbage collection strategies during the sweep phase of the garbage collection, so as to adapt operation of the adaptive garbage collector to approach the desired behavior.

2. The system of claim 1, wherein the virtual machine is a Java virtual machine (JVM).

3. The system of claim 2, wherein the automatic feedback is a proportional, integral, derivative (PID) process for determining how to remove the objects in the memory.

4. The system of claim 3, wherein the PID process calculates an error-based adjustment, based on the difference between the desired value and the current value of a JVM parameter, and controls adaptive adjustment to the JVM to minimize the error between the desired value and the current value.

5. The system of claim 4, wherein the JVM parameter is used to enhance the performance of a feature of the JVM.

6. The system of claim 5, wherein the JVM feature is pause-time minimization, and wherein the JVM parameter is the nursery size.

7. A method for adaptive garbage collection in a virtual machine environment, comprising the steps of:

accessing a computer including a virtual machine thereon for executing applications;

accessing a memory including objects therein related to the applications; and using an adaptive garbage collector, that uses an automatic feedback that continuously monitors current behavior of the adaptive garbage collector and the virtual machine, and continuously makes adjustments to configurable parameters of the adaptive garbage collector and the virtual machine to reduce difference between the current behavior and desired behavior of the adaptive garbage collector and the virtual machine, to collect and remove objects in the memory that are no longer used by the applications;

wherein the adaptive garbage collector is configured to operate in both a mark phase and a sweep phase of garbage collection, including allowing the garbage collector to use one of a concurrent, parallel, and multigenerational garbage collection strategies during the mark phase of the garbage collection, and then switch to using a different one of the concurrent, parallel, and multi-generational garbage collection strategies during the sweep phase of the garbage collection, so as to adapt operation of the adaptive garbage collector to approach the desired behavior.

8. The method of claim 7, wherein the virtual machine is a Java virtual machine (JVM).

9. The method of claim 8, wherein the automatic feedback is a proportional, integral, derivative (PID) process for determining how to remove the objects in the memory.

10. The method of claim 9, wherein the PID process calculates an error-based adjustment, based on the difference between the desired value and the current value of a JVM parameter, and controls adaptive adjustment to the JVM to minimize the error between the desired value and the current value.

11. The method of claim 10, wherein the JVM parameter is used to enhance the performance of a feature of the JVM.

12. The method of claim 11, wherein the JVM feature is pause-time minimization, and wherein the JVM parameter is the nursery size.

13. The system of claim 1, wherein the garbage collection strategy used during the mark phase is different from the garbage collection strategy used during the sweep phase.

14. The system of claim 1, wherein the garbage collection strategy used during the mark phase is same as the garbage collection strategy used during the sweep phase.

15. The method of claim 7, wherein the garbage collection strategy used during the mark phase is different from the garbage collection strategy used during the sweep phase.

16. The method of claim 7, wherein the garbage collection strategy used during the mark phase is same as the garbage collection strategy used during the sweep phase.

* * * * *

UNITED STATES PATENT AND TRADEMARK OFFICE
CERTIFICATE OF CORRECTION

PATENT NO. : 7,529,786 B2  
APPLICATION NO. : 11/396752  
DATED : May 5, 2009  
INVENTOR(S) : Eva Andreasson It is certified that error appears in the above-identified patent and that said Letters Patent is hereby corrected as shown below:

On sheet 4 of 5, in Figure 4, in "Reference Numeral 408", line 2, delete "dif-ference" and insert -- difference --, therefor.

In column 1, line 16, delete "7,174,364," and insert -- 7,174,354, --, therefor.

In column 1, line 18, above "FIELD OF THE INVENTION" insert -- COPYRIGHT NOTICE
A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. --.

In column 3, line 62, after "provided in" delete "copending".

In column 8, line 41, delete "OC 4" and insert -- OC4 --, therefor.

In column 9, line 20, delete "WBproc" and insert -- $WB_{proc}$ --, therefor.

In column 11, line 43, delete "(36k§)." and insert -- (36kb). --, therefor.

In column 12, line 45, delete "setup" and insert -- set up --, therefor.

In column 19, line 41, in claim 1, after "applications;" insert -- and --.

In column 19, line 57, in claim 1, after "parallel" insert -- , --.

In column 21, line 5, in claim 7, delete "multigenerational" and insert -- multi-generational --, therefor.

Signed and Sealed this

Twenty-fifth Day of May, 2010

David J. Kappos  
*Director of the United States Patent and Trademark Office*